US009569717B2

(12) United States Patent
Okada (10) Patent No.: US 9,569,717 B2
(45) Date of Patent: Feb. 14, 2017

(54) MEMORY CARD

(71) Applicant: KABUSHIKI KAISHA TOSHIBA, Minato-ku (JP)

(72) Inventor: Takashi Okada, Yokohama (JP)

(73) Assignee: KABUSHIKI KAISHA TOSHIBA, Minato-ku (JP)

( * ) Notice: Subject to any disclaimer, the term of this patent is extended or adjusted under 35 U.S.C. 154(b) by 23 days.

(21) Appl. No.: 14/482,735

(22) Filed: Sep. 10, 2014

(65) Prior Publication Data

US 2015/0356394 A1 Dec. 10, 2015

Related U.S. Application Data (60) Provisional application No. 62/010,220, filed on Jun. 10, 2014.

(51) Int. Cl.
| | | |
|---|---|---|
| *G06K 19/073* | (2006.01) | |
| *G06F 12/00* | (2006.01) | |
| *G06F 21/00* | (2013.01) | |

(52) U.S. Cl.
CPC ......... *G06K 19/07345* (2013.01); *G06F 12/00* (2013.01); *G06F 21/00* (2013.01)

(58) Field of Classification Search
CPC ................................ H01L 21/50; H01L 21/52
USPC ........................................ 361/679.31–679.39
See application file for complete search history.

(56) References Cited

U.S. PATENT DOCUMENTS

| | | | |
|---|---|---|---|
| 6,381,143 B1 | 4/2002 | Nakamura | |
| 8,097,939 B2 | 1/2012 | Okada | |
| 8,254,134 B2 * | 8/2012 | Hiew | .............. H01L 21/565 |
| | | | 235/492 |
| 2008/0048043 A1 | 2/2008 | Nishiyama | |
| 2009/0168322 A1* | 7/2009 | Okada | .............. H05K 1/181 |
| | | | 361/679.32 |
| 2010/0224973 A1* | 9/2010 | Han | .............. B29C 65/08 |
| | | | 257/678 |

FOREIGN PATENT DOCUMENTS

| | | |
|---|---|---|
| JP | 2005-352978 | 12/2005 |
| JP | 2008-52412 | 3/2008 |
| JP | 2008-146375 | 6/2008 |
| JP | 2009-157628 | 7/2009 |

* cited by examiner

*Primary Examiner* — Anthony Haughton
(74) *Attorney, Agent, or Firm* — Oblon, McClelland, Maier & Neustadt, L.L.P.

(57) ABSTRACT

According to one embodiment, a memory card includes a first case including a first surface, the first surface including a groove, and the first case including a recessed area, a second case including a second surface, the second case being bonded to the first case, a memory disposed between the first case and the second case, a write-protect switch disposed between the first case and the second case and disposed in the recessed area, and a first director disposed between the first case and the second case, the first director being provided along an edge portion of the first case or the second case excluding the recessed area.

19 Claims, 9 Drawing Sheets

MEMORY CARD

CROSS-REFERENCE TO RELATED APPLICATIONS

This application claims the benefit of U.S. Provisional Application No. 62/010,220, filed Jun. 10, 2014, the entire contents of which are incorporated herein by reference.

FIELD

Embodiments described herein relate generally to a memory card.

BACKGROUND

A memory card comprises, for example, a semiconductor storage device of SiP (System in Package) structure, and a resin case covering it. The resin case comprises an upper case and a lower case. The upper case and the lower case are welded, for example, by ultrasonic bonding method.

DETAILED DESCRIPTION

In general, according to one embodiment, a memory card comprises: a first case comprising a first surface, the first surface including a groove, and the first case including a recessed area; a second case comprising a second surface, the second case being bonded to the first case; a memory disposed between the first case and the second case; a write-protect switch disposed between the first case and the second case and disposed in the recessed area; and a first director disposed between the first case and the second case, the first director being provided along an edge portion of the first case or the second case excluding the recessed area.

Embodiments will be described hereinafter with reference to the accompanying drawings. In these drawings, the same parts are designated by the same reference numerals. Also, duplicated descriptions are given as necessary.

First Embodiment

Figure 1A:
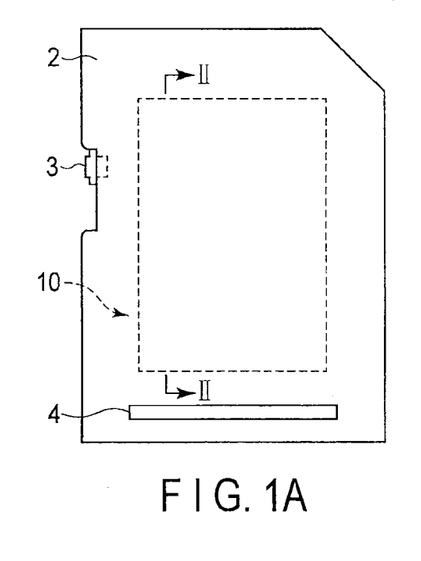
FIG. 1A is a plan view showing an external form of a memory card according to a first embodiment.
Figure 1B:
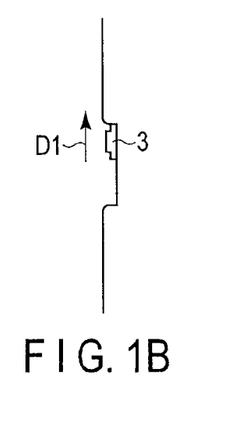
FIG. 1B is a plan view showing a position of a switch portion of a write-protect switch in a state where writing of data in a memory card is permitted.
Figure 1C:
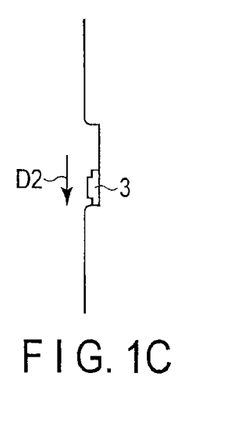
FIG. 1C is a plan view showing a position of the switch portion of the write-protect switch in a state where writing of data in the memory card is inhibited.

FIG. 1A is a plan view showing an external form of a memory card 1 according to a first embodiment, FIG. 1B is a plan view showing a position of a write-protect switch 3 in a state where writing of data in the memory card 1 is permitted, and FIG. 1C is a plan view showing a position of the write-protect switch in a state where writing of data in the memory card is inhibited.

The memory card 1 of the present embodiment is a memory card of, for example, the SD™ standard (SD™ card). The memory card 1 includes a case 2, and a semiconductor storage device 10 of, for example, an SiP (System in Package) structure (SiP package) accommodated in the case 2.

The memory card 1 further comprises a write-protect switch 3 configured to switch between a first state in which writing of data in the memory card 1 is permitted and a second state in which writing of data in the memory card 1 is inhibited. On the external surface of the case 2, the memory card 1 includes a groove 4. Such a groove 4 has a function allowing the memory card 1 to be pulled out from an external device (not shown). A planar shape of the groove 4 is, for example, a rectangle. Such a groove 4 extends in a direction perpendicular to an insertion direction of the memory card 1. Although the groove 4 extends in the direction perpendicular to the insertion direction of the memory card 1 in FIG. 1A, the groove 4 is not limited to such a case, and may be any configuration as long as the above mentioned function is fulfilled.

As shown in FIG. 1B, when the write-protect switch 3 is moved to the direction indicated by the arrow, the first state is set. Also, as shown in FIG. 1C, when the write-protect switch 3 is moved to the direction indicated by the arrow, the second state is set.

The external device determines which of the states of FIGS. 1A and 1B the write-protect switch 3 is set to. When the write-protect switch 3 is in the state of FIG. 1A, the external device can write data in the memory card 1. When the write-protect switch 3 is in the state of FIG. 1B, the external device cannot write data in the memory card 1. That is, writing of data is inhibited.

Figure 2:
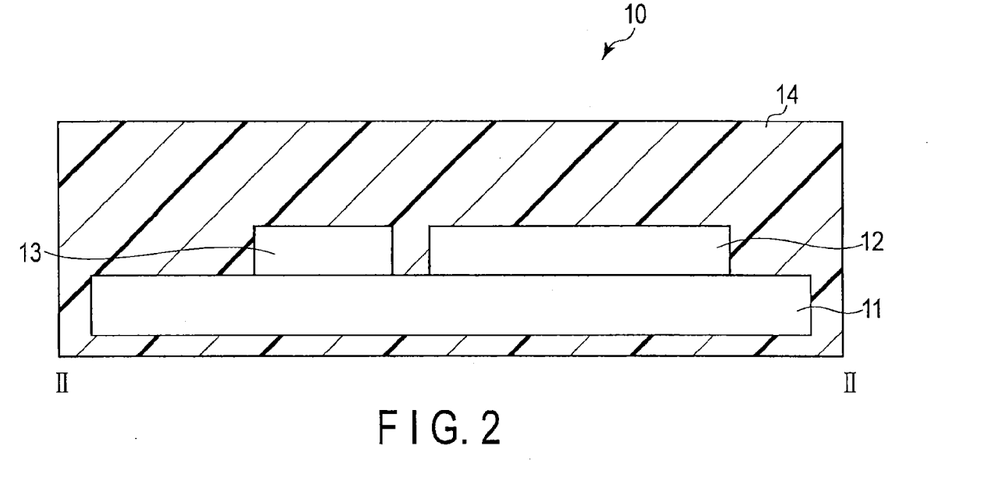
FIG. 2 is a II-II cross-sectional view of FIG. 1A.

FIG. 2 is a II-II cross-sectional view of the semiconductor storage device 10 of the memory card 1 in FIG. 1A. As shown in FIG. 2, the semiconductor storage device 10 includes a circuit board 11, a NAND flash memory (nonvolatile memory) 12 provided on the circuit board 11, and a controller 13 configured to control the NAND flash memory 12. Other types of nonvolatile memories, such as an MRAM (nonvolatile magnetic memory), may be used instead of the NAND flash memory 12 (nonvolatile semiconductor memory). The semiconductor storage device 10 further includes a mold resin 14 which seals the circuit board 11, the NAND flash memory 12, and the controller 13.

The case 2 includes, for example, an upper case and a lower case made of resin.

Figure 3:
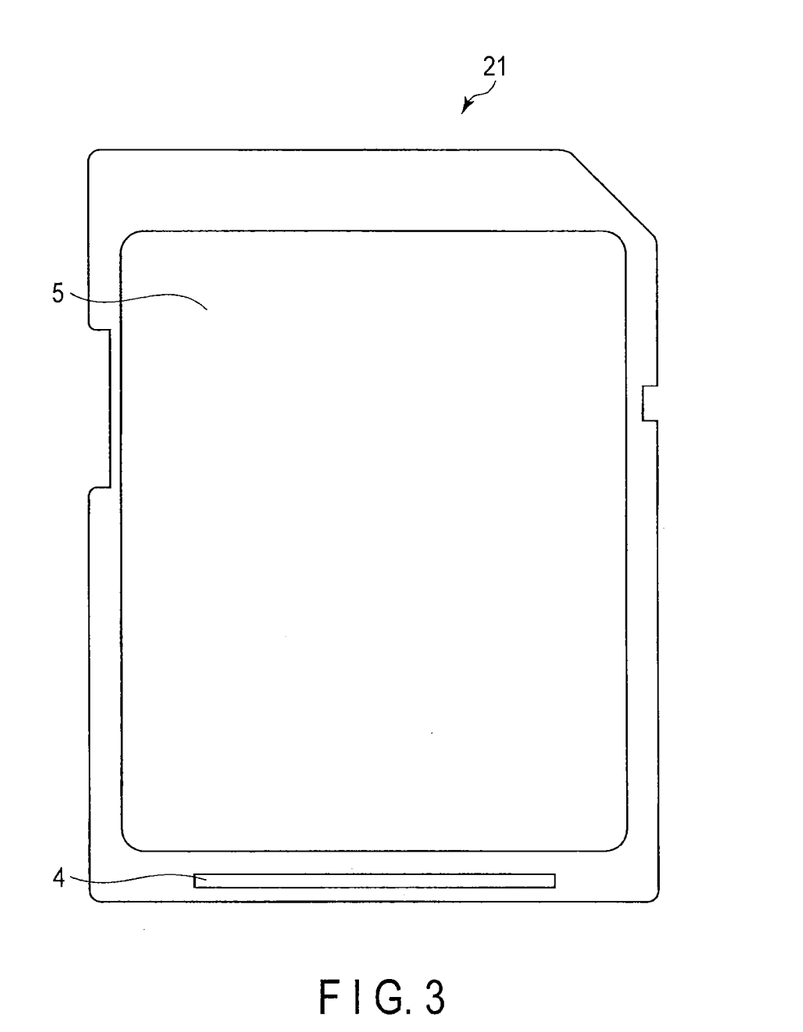
FIG. 3 is a plan view schematically showing a first surface of an upper case.

FIG. 3 is a plan view which schematically shows a first surface of an upper case 21. In a central part of the surface of the upper case 21, a groove 5 is provided. A product label is attached to the groove 5. For example, when the product label is attached to the groove 5, a surface of the product label is flush with a portion excluding the groove 5 and the groove 4 of the upper case 21. It is noted that the groove 4 is identical with the groove 4 described with reference to FIG. 1A. A depth of the groove 5 is not necessarily the same as the thickness of the product label, and the depth of the groove 5 may be, for example, greater than the thickness of the product label.

Figure 4A:
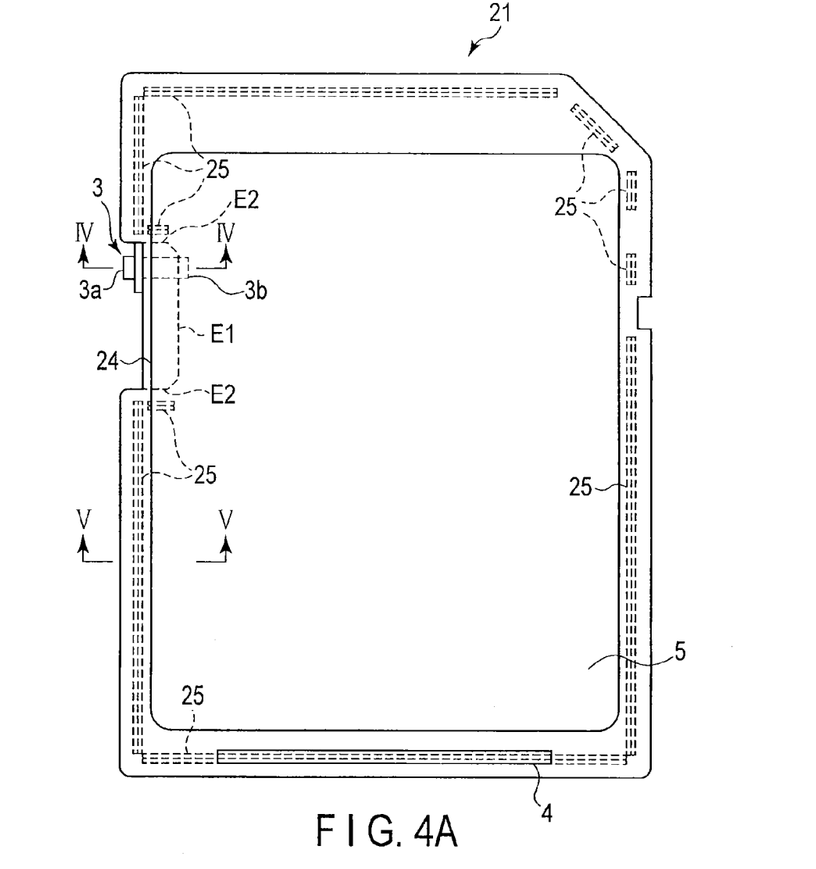
FIG. 4A is a plan view schematically showing a second surface of the upper case.
Figure 4B:
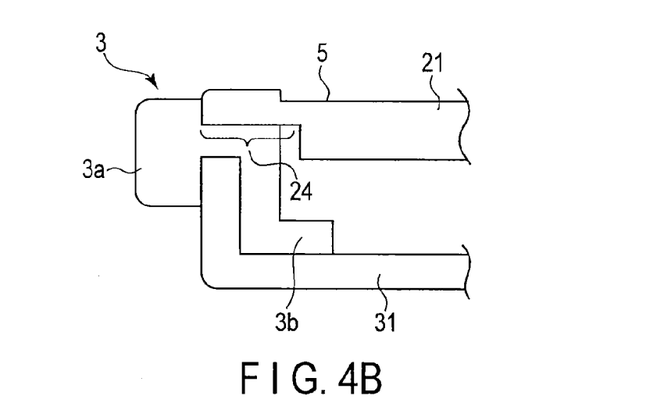
FIG. 4B is a IV-IV cross-sectional view of FIG. 4A.

FIG. 4A is a plan view which schematically shows a second surface of the upper case 21. However, in FIG. 4, in order to facilitate understanding the relationship with FIG. 3, each element of the second surface of the upper case 21 is projectively shown as seen from the first surface of the upper case 21. Here, in FIG. 4A, the each element projectively shown on the second surface of the upper case 21 is indicated by dotted lines. FIG. 4B is a IV-IV cross-sectional view of FIG. 4A.

A first edge portion of the second surface of the upper case 21 has a recessed area 24 which is lower than a central part of the second surface in a plane. The write-protect switch 3 is arranged between the upper case 21 and a lower case 31, and in the recessed area 24. In the present embodiment, the write-protect switch 3 includes an operation portion 3*a*, and a switch portion 3*b* which slides in accordance with the operation of the operation portion 3*a*. In this case, a part of the switch portion 3*b* is arranged in the recessed area 24 of the upper case 21. Moreover, energy directors (members for welding) 25 are provided on the second surface of the upper case 21. The energy directors 25 have a function for bonding the upper case 21 and the lower case 31 by ultrasonic bonding method. As shown in FIG. 4A, the energy directors 25 are provided along a second edge portion of the second surface of the upper case 21 except an edge portion E1 of the recessed area 24 extending along the first edge portion of the upper case 21.

However, energy directors 25 may be provided at edge portions E2 of the recessed area 24, which extend in a direction crossing the first edge portion. This is because the edge portions E2 are close to the first edge portion of the upper case 21 or an edge portion of the groove 5.

As described above, in the present embodiment, the energy directors 25 on the second surface of the upper case 21 are not disposed in the edge portion E1 of the recessed area 24 extending along the first edge portion of the upper case 21. This intends to prevent generation of a bulge on the memory card due to insufficient melting of the energy directors 25 at the time of bonding the upper case 21 and the lower case 31, as described later.

This effect is particularly significant when a distance from the edge portion of the groove 5 to the edge portion E1 of the recessed area 24 is greater than 10 mm. This is because in such a distance, when the energy director is arranged along the edge portion E1 of the recessed area 24, it would be difficult to melt the energy director by ultrasonic vibration.

It is noted that the energy directors 25 are triangle in a cross section in a direction that the upper case 21 and the lower case 31 are bonded and vertical to the edge portions of the upper case 21. However, the shapes of the energy directors 25 are not limited to the above mentioned shapes, and may be trapezoidal, rectangular or the like in the same cross section.

Figure 5A:
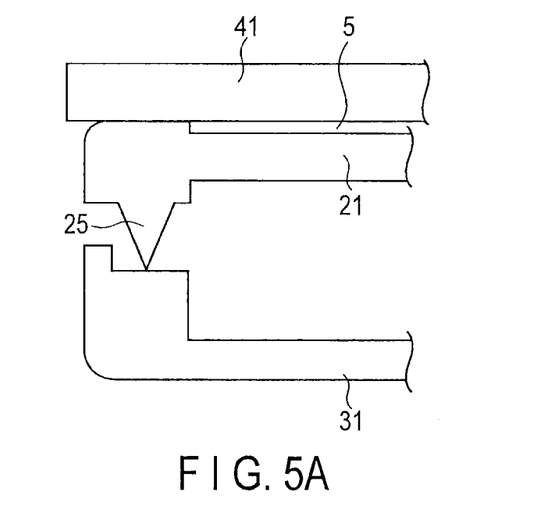
FIGS. 5A and 5B are illustrations for describing a principle of an ultrasonic bonding method and a structure of an energy director.
Figure 5B:
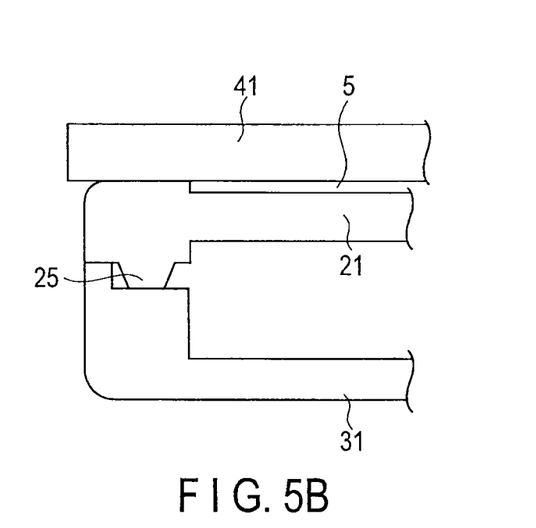

FIGS. 5A and 5B are illustrations for describing a principle of the ultrasonic bonding method and a structure of the energy director. FIGS. 5A and 5B are V-V cross-sectional views of FIG. 4A. Before the upper case 21 and the lower case 31 are bonded, the cross-sectional shape of the energy director 25 is triangular, for example, as shown in FIG. 5A. Then, in bonding the upper case 21 and the lower case 31, a flat-shaped jig (horn) 41 is brought into contact with the first surface of the upper case 21. The horn 41 is the jig which vibrates by itself by ultrasonic waves generated by an ultrasonic generator, thereby applying the ultrasonic vibration to the energy directors 25 and melting the energy directors 25.

As shown in FIG. 5B, in bonding the upper case 21 and the lower case 31, when the horn 41 is made to perform ultrasonic vibration, the energy directors 25 are melted by the ultrasonic vibration, and the upper case 21 and the lower case 31 are bonded to each other.

Here, in the upper case 21, the groove 5 is formed. Therefore, in a region where the groove 5 is formed, vibration of the horn 41 is hard to be transmitted to the upper case 21. For this reason, the energy directors 25 should preferably be disposed outside the region where the groove 5 is formed. A positional relationship between the energy directors 25 and the groove 5 will be hereinafter described.

Figure 6A:
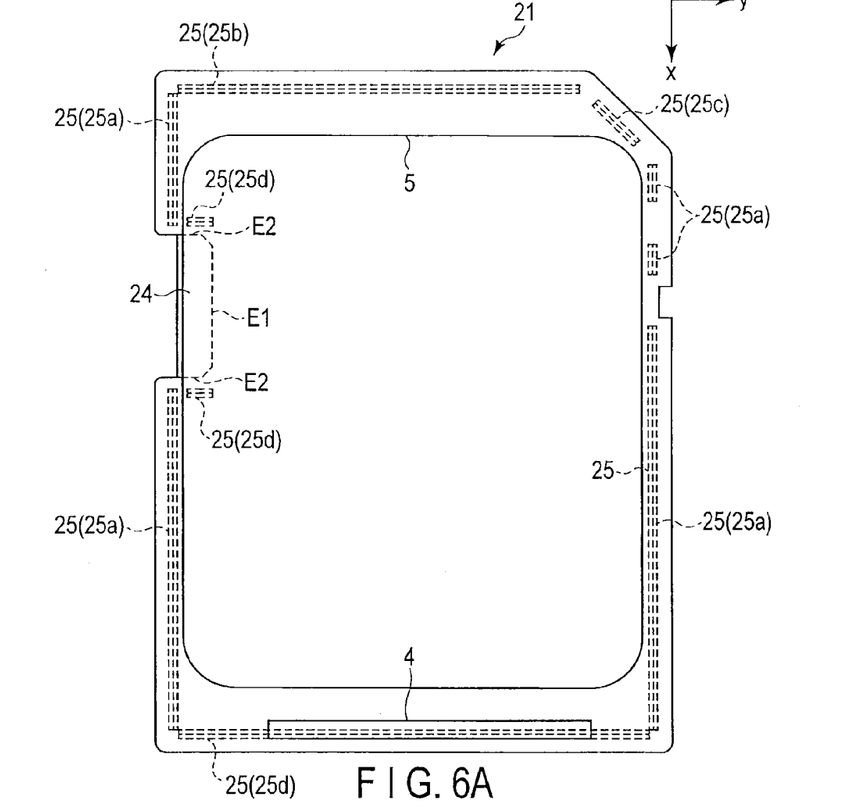
FIG. 6A is a plan view showing a positional relationship between a groove of FIG. 3 and energy directors.

FIG. 6A is a plan view showing the positional relationship between the energy directors 25 and the groove 5. On the second surface of the upper case 21, in a region outside the groove 5 of the upper case 21, energy directors 25*a*, 25*b*, and 25*c* are provided.

The energy directors 25*a* are provided along edge portions of the upper case 21, that is, the edge portions in longitudinal direction x among the periphery of the upper case 21. Also, the energy directors 25*b* are provided along edge portions of the upper case 21, that is, the edge portions in transverse direction y of the periphery of the upper case 21. Further, the energy director 25*c* is provided along an edge portion of the upper case 21, that is, the edge portion in a direction other than longitudinal direction x and transverse direction y (i.e., the oblique direction) of the periphery of the upper case 21.

Energy directors 25*d* are provided in a region inside of the groove 5 of the upper case 21 among the second surface of the upper case 21. That is, the energy directors 25*d* are provided in edge portions E2 of the recessed area 24 extending in a direction which crosses the first edge portion of the upper case 21, and are not provided in edge portion E1 of the recessed area 24 extending along the first edge portion of the upper case 21.

This is because the edge portions E2 are close to the first edge portion of the upper case 21 or the edge portion of the groove 5. Since the energy directors 25*d* are provided in the region near the edge portion of the groove 5, the energy directors 25*d* can sufficiently receive the ultrasonic vibration from the horn 41 to melt them when the upper case 21 and the lower case 31 of FIGS. 5A and 5B are bonded, for example.

Figure 6B:
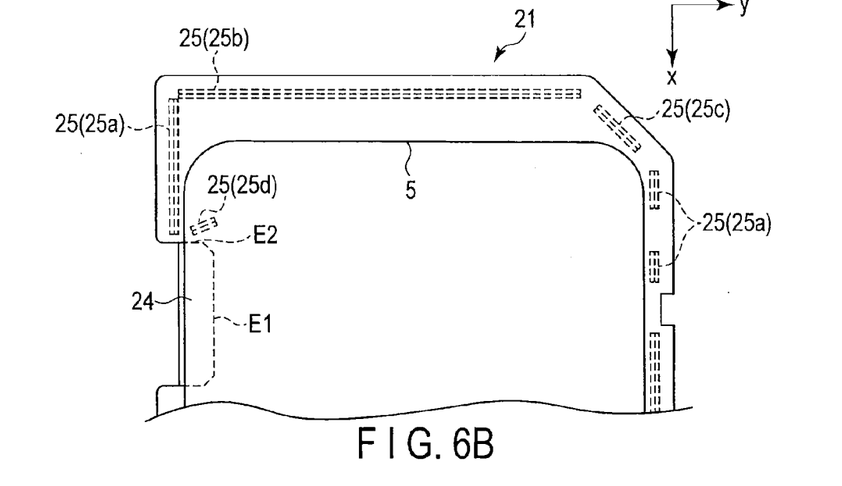
FIG. 6B is a plan view showing a positional relationship between the groove of FIG. 3 and another energy director.

It is noted that while the energy directors 25*d* extend in Y direction (horizontal direction) in FIG. 6A, they may extend in an oblique direction as shown in FIG. 6.

Moreover, the energy director 25*d* may be provided to extend toward the interior of the groove 5 from the exterior of the groove 5 of the upper case 21. The ultrasonic vibration from the horn 41 can be easily transmitted to the energy directors 25 from the peripheral portion of the upper case 21 in this case as well.

Figure 7:
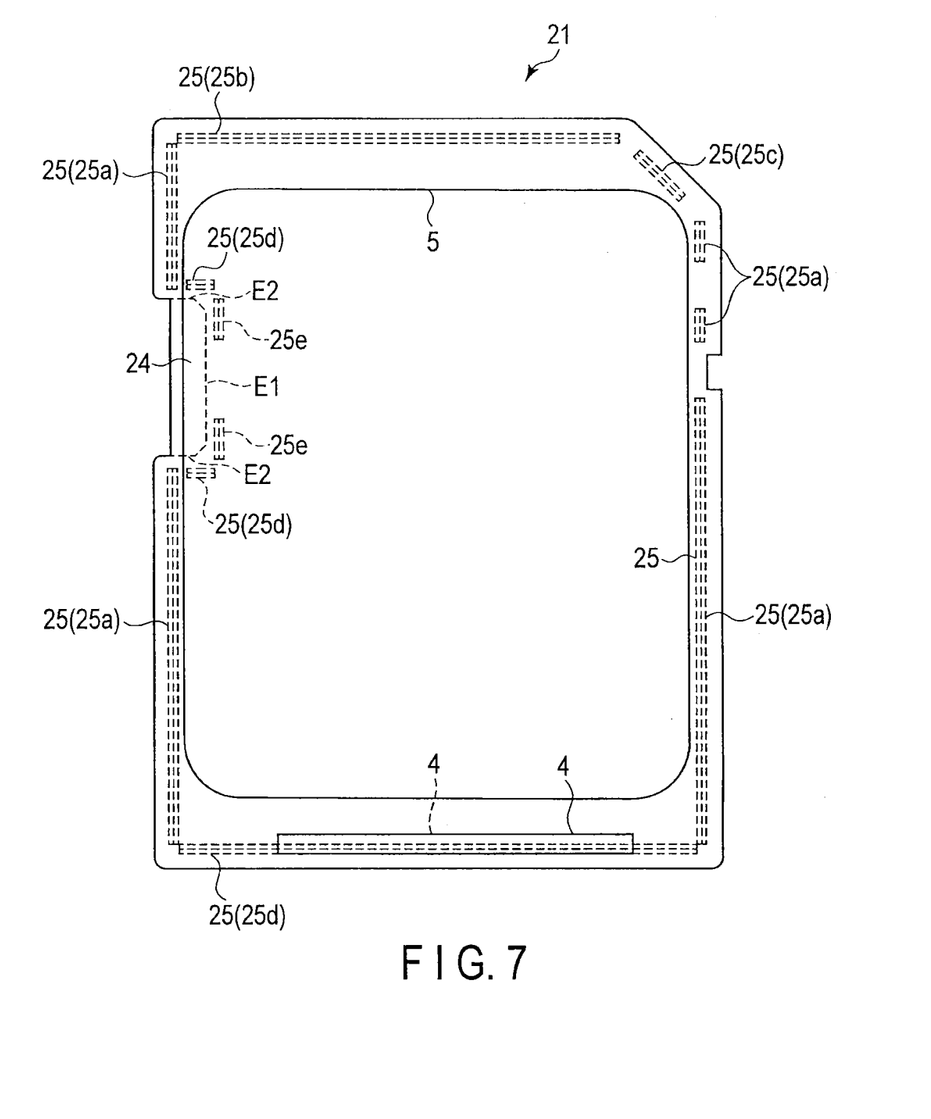
FIG. 7 is a plan view showing arrangement of energy directors of a comparative example.

FIG. 7 is a plan view showing the arrangement of energy directors of a comparative example. A point in which the comparative example is different from the present embodiment is that energy directors 25*e* are provided in edge portion E1 of a recessed area 24 extending along a first edge portion of an upper case 21, and the positions of the energy directors 25*e* are far away from the peripheral portion of the upper case 21 (edge portion of groove 5).

In this case, in bonding the upper case 21 and a lower case 31, since ultrasonic vibration from the horn is hard to be transmitted to the energy directors 25*e*, the energy directors 25*e* cannot be sufficiently melted. Consequently, even after bonding the upper case 21 and the lower case 31, the energy directors 25*e* still have a triangular shape as shown in FIG. 5A, and the convex portion a part of a memory card (the upper case and the lower case) will be bulged by the protrusion of each of the energy directors 25*e*.

For example, in the comparative example, having inspected variations in thickness of the memory card using a micrometer, the memory card had the maximum thickness in the area where the energy directors 25*e* are formed, and the thickness is 2.243 mm. Moreover, the minimum thickness of the memory card is 2.164 mm. That is, it has been found that a difference between the maximum value and the minimum value is 0.079 mm, and the thickness has the variation of approximately 3.5% of the maximum value.

Such a variation in thickness causes an unsightly appearance of the memory card, but also produces adverse effects, such as unconformity with the standard of the memory card, difficulty inserting the memory card into a connector provided in an external device and removing the memory card therefrom, degrading operability, and being a cause of damage to the memory card.

In the present embodiment, since no energy director is arranged in a region where the ultrasonic vibration from the horn is hard to be transmitted, the bulge of the memory card as mentioned above can be reduced.

In the present embodiment, having inspected variations in thickness of the memory card using a micrometer, the memory card has little thickness variation. For example, an average thickness of the memory card of FIG. 4A is 2.150 mm, and considering the variations (3σ, where σ is a standard deviation), it has been found that the thickness falls within the range of 2.150 mm±0.03 mm.

In this manner, in the present embodiment, by devising the positions of the energy directors, a highly-reliable memory card can be realized.

Second Embodiment

Figure 8:
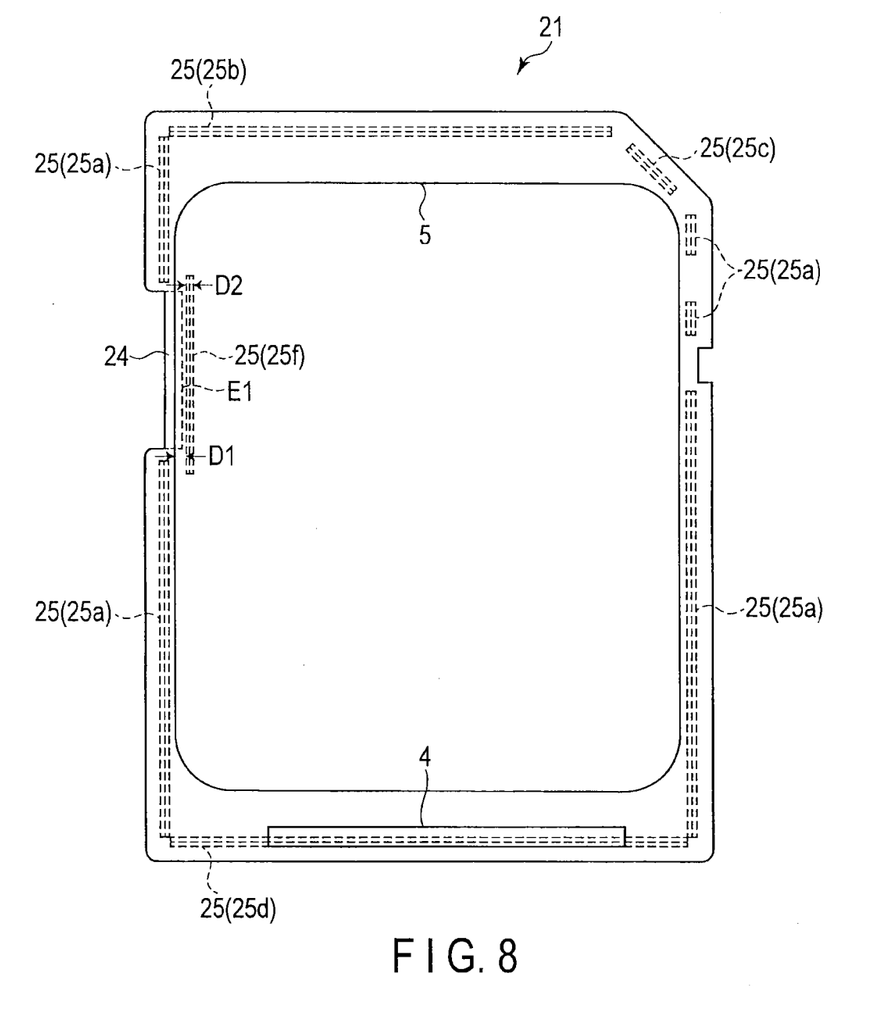
FIG. 8 is a plan view showing a positional relationship between energy directors and a groove of a memory card according to a second embodiment.

FIG. 8 is a plan view showing the positional relationship between energy directors 25 and grooves 4 and 5 of a memory card of a second embodiment, which corresponds to FIG. 6A of the first embodiment.

In the present embodiment, an energy director 25*f* is provided in the interior of a groove 5 of an upper case 21, that is, in edge portion E1 of a recessed area 24 extending along a first edge portion of the upper case 21. However, distance D1 from an edge portion of the groove 5 to the energy director 25*f* is, for example, 10 mm. That is, the distance from a region on which the horn directly contacts to the energy director 25*f* is set to a predetermined value or less.

The reason for limiting the distance is that even if the energy director 25*f* is provided in the interior of the groove 5 of the upper case 21, when the distance from the edge portion of the upper case 21 where vibration of the horn is directly transmitted is set at or below the predetermined value, sufficient ultrasonic vibration can be transmitted to the energy director 25*f* to melt it.

It is noted that the distance D1 from the edge portion of the groove 5 to the energy director 25*f* should preferably be 10 mm or less.

Here, width D2 and height of the energy director 25*f* may be the same as the width and height of each of energy directors 25*a*, 25*b*, and 25*c*, or smaller than the width and height of each of the energy directors 25*a*, 25*b*, and 25*c*. Alternatively, it is sufficient to merely reduce one of the width D2 and height of the energy director 25*f*.

Considering that the energy director 25*f* is separated from the edge portion of the groove 5 by a certain distance, by reducing a volume per given length of the energy director 25*f* to be smaller than the volume per given length of each of the energy directors 25*a*, 25*b*, and 25*c*, all of the energy directors 25*a* to 25*f* can be melted similarly.

Generally, the distance D1 from the edge portion of the groove 5 to the energy director 25*f* and the volume per given length of the energy director 25*f* have an inversely proportional relationship. That is, preferably, the greater distance D1 from the edge portion of the groove 5 to the energy director 25*f* is, the smaller the volume per given length of the energy director 25*f* should be.

In the present embodiment, by increasing the longitudinal dimension of the energy director 25*f* to be greater than that of the recessed area 24, strength of the weld between the upper case and the lower case in the region where the protect switch is arranged is increased. Thereby, having a trouble in a switch operation, which is caused by separation of the upper case and the lower case when the protect switch is moved, can be fully suppressed.

Third Embodiment

Figure 9:
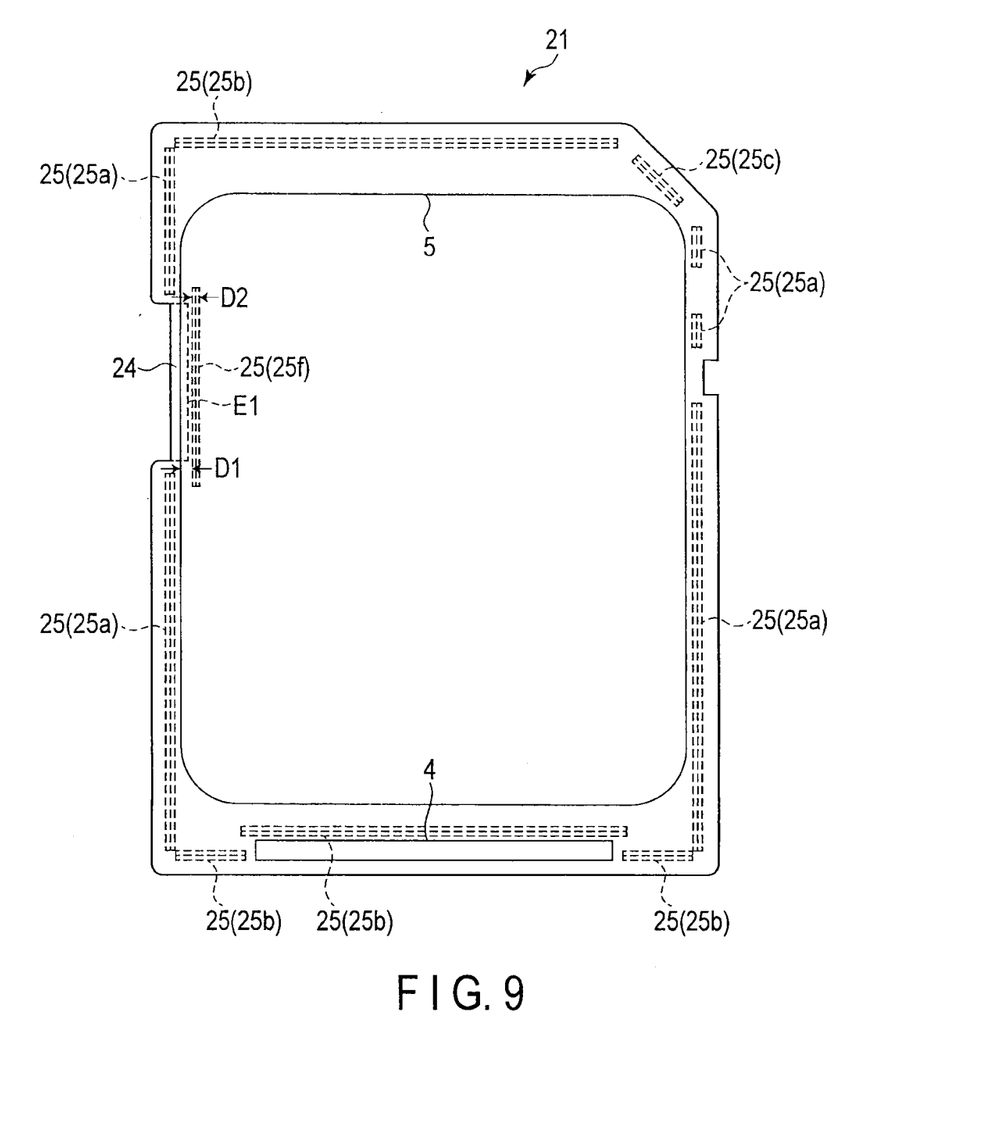
FIG. 9 is a plan view showing a positional relationship between energy directors and a groove of a memory card according to a third embodiment.

FIG. 9 is a plan view showing the positional relationship between energy directors 25 and grooves 4 and 5 of a memory card of a third embodiment, which corresponds to FIG. 6A of the first embodiment.

In the second embodiment (FIG. 8), the energy director 25*b* overlaps the groove 4, but in the present embodiment, an energy director 25*b* is arranged so that the energy director does not overlap the groove. For example, when the energy director 25*b* is arranged in a region between the groove 4 and the groove 5, since the vibration of the horn is effectively transmitted to the energy director 25*b* via the upper case 21, the energy director 25*b* can be easily melted.

Fourth Embodiment

Figure 10:
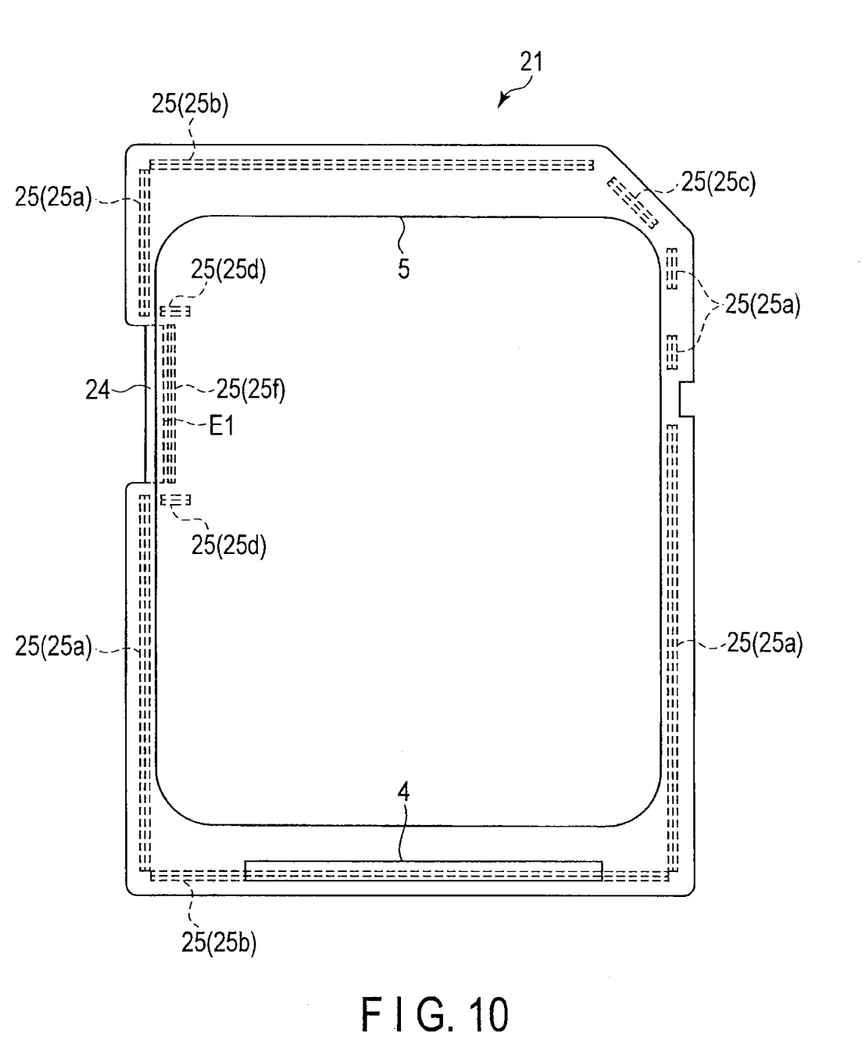
FIG. 10 is a plan view showing a positional relationship between energy directors and a groove of a memory card according to a fourth embodiment.

FIG. 10 is a plan view showing the positional relationship between energy directors 25 and grooves 4 and 5 of a memory card of a fourth embodiment.

This embodiment is the combination of FIG. 6A of the first embodiment and FIG. 8 of the second embodiment.

As described above, by combining the aforementioned embodiments, the vibration of the horn is effectively transmitted to all energy directors 25 via the upper case 21. Therefore, all of the energy directors 25 can be easily melted.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A memory card comprising:
   a first case comprising a first surface including a groove, and a second surface being opposite to the first surface and including a recessed area, the recessed area comprising a first edge portion and a second edge portion, and a distance from an edge portion of the groove to the first edge portion of the recessed area being greater than 10 mm in a perspective view where the groove is projected on the second surface;
   a second case bonded to the first case;
   a memory disposed between the first case and the second case; and
   a write-protect switch disposed between the first case and the second case and disposed in the recessed area.

2. The memory card of claim 1, further comprising a director disposed between the first case and the second case, and wherein the director is provided outside the groove in a perspective view where the groove is projected on the second surface of the first case.

3. The memory card of claim 1, further comprising a first director disposed between the first case and the second case and provided outside the recessed area, wherein the first director is provided along the second edge portion of the recessed area, and is not provided along the first edge portion of the recessed area.

4. The memory card of claim 3, wherein the first director is provided in an interior of the groove in a perspective view where the groove is projected on the second surface.

5. The memory card of claim 3, wherein the first director extends toward an interior of the groove from an exterior of the groove in a perspective view where the groove is projected on the second surface.

6. The memory card of claim 3, wherein the first edge portion is longer than the second edge portion, and the second edge portion extends in a direction crossing the first edge portion and is closer to the edge portion of the first case than the first edge portion.

7. The memory card of claim 1, wherein the groove overlaps the recessed area in a perspective view where the groove is projected on the second surface.

8. The memory card of claim 1, wherein the first edge portion is longer than the second edge portion, and the second edge portion extends in a direction crossing the first edge portion and is closer to the edge portion of the first case than the first edge portion.

9. A memory card comprising:
   a first case comprising a first surface including a groove, and a second surface being opposite to the first surface and including a recessed area;
   a second case bonded to the first case;
   a memory disposed between the first case and the second case;
   a write-protect switch disposed between the first case and the second case and disposed in the recessed area; and
   a first director disposed between the first case and the second case, the first director being provided along a first edge portion of the recessed area,
   wherein a distance from an edge portion of the groove to the first edge portion of the recessed area is 10 mm or less in a perspective view where the groove is projected on the second surface of the first case.

10. The memory card of claim 9, wherein the first director is provided in an interior of the groove in a perspective view where the groove is projected on the second surface.

11. The memory card of claim 9, further comprising a second director disposed between the first case and the second case, and wherein the second director is provided outside the groove in a perspective view where the groove is projected on the second surface.

12. The memory card of claim 11, wherein a volume per given length of the first director is smaller than a volume per given length of the second director.

13. The memory card of claim 9, wherein a volume per given length of the first director is inversely proportional to the distance.

14. The memory card of claim 9, further comprising a third director, and wherein the recessed area further comprises a second edge portion and the third director is provided along the second edge portion.

15. The memory card of claim 14, wherein the third director is provided in an interior of the groove in a perspective view where the groove is projected on the second surface.

16. The memory card of claim 14, wherein the third director extends toward an interior of the groove from an exterior of the groove in a perspective view where the groove is projected on the second surface.

17. The memory card of claim 14, wherein the first edge portion is longer than the second edge portion, and the second edge portion extends in a direction crossing the first edge portion and is closer to the edge portion of the first case than the first edge portion.

18. The memory card of claim 9, wherein the groove overlaps the recessed area in a perspective view where the groove is projected on the second surface.

19. The memory card of claim 9, wherein the recessed area further comprises a second edge portion, and the first edge portion is longer than the second edge portion, and the second edge portion extends in a direction crossing the first edge portion and is closer to the edge portion of the first case than the first edge portion.

* * * * *